T. F. BOURNE.
WIND SHIELD.
APPLICATION FILED DEC. 24, 1910.
1,012,239.
Patented Dec. 19, 1911.
3 SHEETS—SHEET 1.
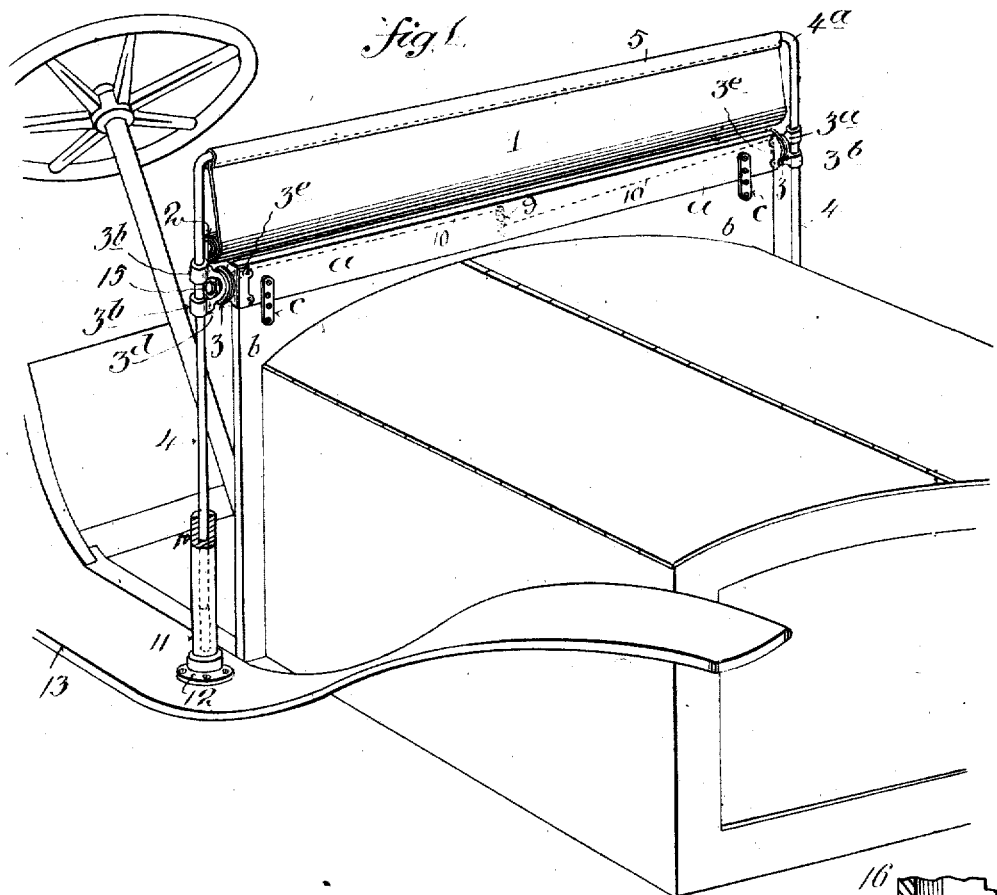
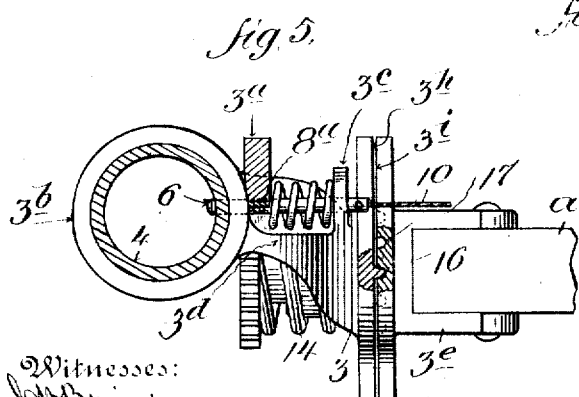
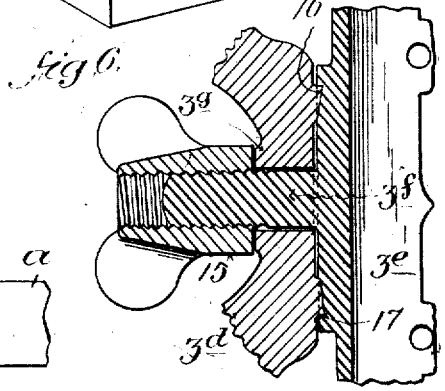
Inventor
T. F. Bourne T. F. BOURNE.
WIND SHIELD.
APPLICATION FILED DEC. 24, 1910.
1,012,239.
Patented Dec. 19, 1911.
3 SHEETS—SHEET 2.
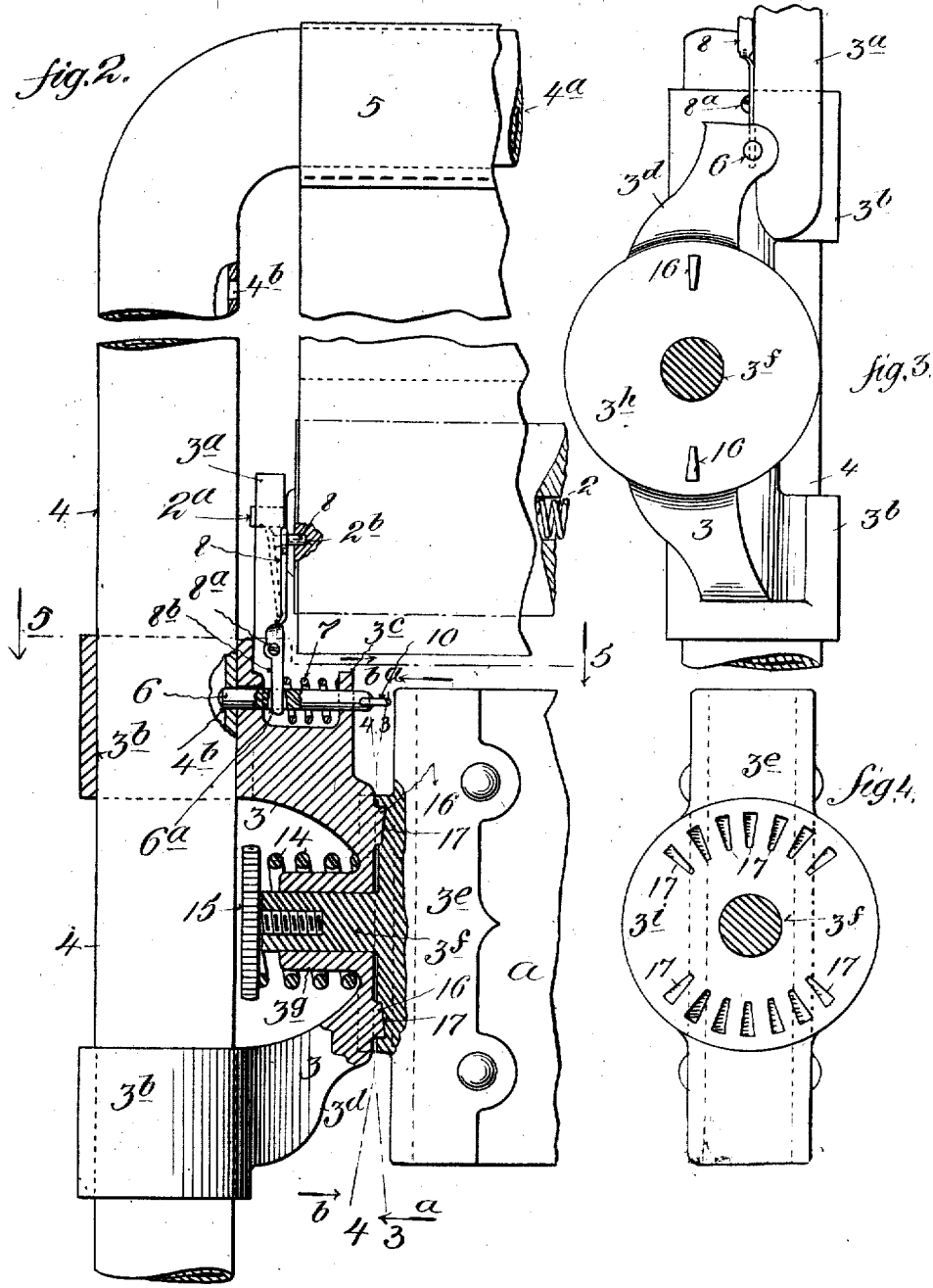
Witnesses:
Inventor
T. F. Bourne

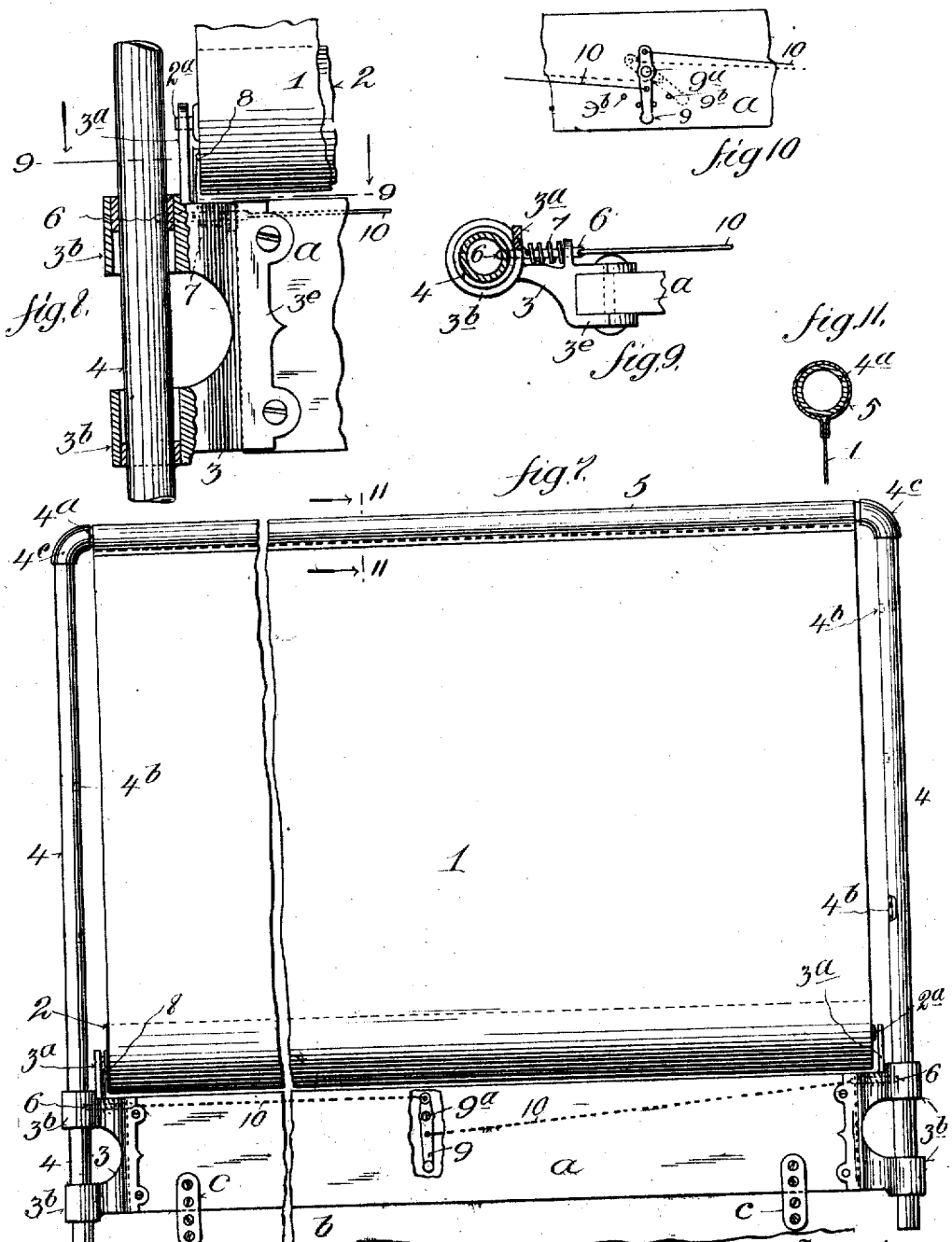

UNITED STATES PATENT OFFICE.

THEODORE F. BOURNE, OF MONTCLAIR, NEW JERSEY.

WIND-SHIELD.

1,012,239.  Specification of Letters Patent.  Patented Dec. 19, 1911.

Application filed December 24, 1910. Serial No. 599,117.

*To all whom it may concern:*

Be it known that I, THEODORE F. BOURNE, a citizen of the United States, residing at Montclair, in the county of Essex and State of New Jersey, have invented certain new and useful Improvements in Wind-Shields, of which the following is a specification.

The object of my invention is to provide a shield adapted for use on automobiles and other vehicles, as well as on boats, for protecting the occupants against wind and storms, capable of being raised to desired heights and lowered, and wherein the supports for the flexible material of the shield will be raised and lowered equally with such material and will be out of the way in proportion as the shield is lowered.

In carrying out my invention I provide a flexible shield comprising suitable transparent material, means, such as a roller, to let out and take up the material as the shield is raised or lowered, longitudinally slidable supports for the free end of the shield depending at the sides thereof, guides for said supports suitably carried by the vehicle, and means for sustaining said supports at different heights, whereby as the shield is raised and lowered the supports will be correspondingly raised and lowered and will be maintained in proper operating positions on the respective guides at different elevations of the shield.

My invention also comprises means whereby the shield may be tilted or inclined as desired while at any desired height to present the shield at an angle to the line of travel, whereby the shield may be presented the closer to the driver and wind resistance on the shield may be reduced.

My invention further comprises novel details of improvement that will be more fully hereinafter set forth and then pointed out in the claims.

Reference is to be had to the accompanying drawings forming part hereof, wherein, Figure 1 is a perspective view illustrating my improvements applied to an automobile, the shield being partly lowered; Fig. 2 is a partly broken view, enlarged, of a portion of the shield; Fig. 3 is a section on the line 3 in Fig. 2 looking in the direction of the arrows *a*; Fig. 4 is a section on the line 4 in Fig. 2, looking in the direction of the arrow *b;* Fig. 5 is a section on the line 5, 5, in Fig. 2, looking in the direction of the arrows; Fig. 6 is a sectional detail of modified means for retaining the pivoted guides in set position; Fig. 7 is a detail face view illustrating the shield elevated and showing the guides for the shield supports as non-pivoted; Fig. 8 is a detail view, partly in section, of a portion of Fig. 7; Fig. 9 is a section on the line 9, 9, in Fig. 8; Fig. 10 is a detail reverse view of a portion of Fig. 7, and Fig. 11 is a detail section on the line 11, 11, in Fig. 7

Similar numerals of reference indicate corresponding parts in the several views.

In the drawings the numeral 1 indicates a flexible shield, wholly or partly of suitable transparent material, such as celluloid, fiberloid or the like, shown mounted to be wound upon a suitable roller 2 which may be like the ordinary shade roller containing a spring. The pivots $2^a$ of roller 2 are carried by spaced brackets 3, being shown supported by extensions $3^a$ of said brackets. The brackets 3 are shown secured upon a filler board *a* secured to dash *b* by clips *c*, although said brackets may be secured directly to the dash or other support. Said brackets are provided with alined guides $3^b$ shown in hollow or tubular form slidably receiving the spaced shield supports or uprights 4 that are suitably connected with the free end of flexible shield 1, the supports 4 and guides $3^b$ thus acting in telescopic manner. The upper ends of supports 4 are connected by a transverse member comprising a cross rod, bar or tube $4^a$ to which the free end of shield 1 is suitably attached, as by a strip 5 carried by rod $4^a$ and stitched or otherwise connected with shield 1. The supports 4 and the connecting rod or tube $4^a$ may be formed in a single piece or connected together in other suitable manner; as by elbows or the like $4^c$, whereby supports 4 are firmly united together at their upper parts and are maintained in alinement with each other, or substantially in the same plane, substantially in yoke-like form, for easy sliding movement with respect to the guides $3^b$ of brackets 3, whereby as the parts 4, $4^a$ are raised or lowered, the flexible shield 1 will be correspondingly raised or lowered and will unwind from or wind upon roller 2.

I have shown suitable means for maintaining the longitudinally slidable supports or uprights 4 in various positions of elevation. To this end I have shown locking devices comprising stops shown in the form of slidable bolts 6 guided in bearings in brackets 3 adapted to enter openings or sockets 4ᵇ in supports 4 that are suitably spaced apart. Springs 7 are shown bearing against stops 3ᶜ on the brackets and against suitable projections or shoulders on bolts 6 to maintain the latter projected into the corresponding openings 4ᵇ. It may be found desirable to use ratchetless rollers for the shields 1, and in such case to avoid requiring too great spring tension in the roller, due to wind pressure against the shield, I provide means for positively locking or holding the roller against unwinding. For this purpose I have shown a lock or stop 8 adapted to engage the recesses or teeth 2ᵇ provided in or on roller 2. Lock or stop 8 is shown pivotally carried by bracket 3, as at 8ᵃ, and operatively connected with a bolt 6, for which purpose I have shown the lower end 8ᵇ of lock 8 passing through an opening 6ᵃ in bolt 6. The arrangement is such that when bolt 6 is withdrawn to release support 4, lock 8 will thereby be withdrawn from roller 2 to release the latter, and when bolt 6 moves to sustain support 4 lock 8 will return to retain roller 2. This arrangement affords convenient means for simultaneously releasing supports 4 and the roller by one operation at the same time that the flexible shield is to be raised or lowered. There will preferably be a bolt 6 to coact with each support 4, as illustrated in Fig. 7. Any suitable means may be provided for simultaneously operating both bolts 6. For this purpose I have shown a handle or lever 9 connected by rods, wires or the like 10 with bolts 6, rods or wires 10 being shown connected with handle or lever 9 on opposite sides of pivot 9ᵃ of said lever, whereby the movement of said lever in one direction will cause simultaneous operation of both bolts 6. Lever 9 may be carried by filler board a, as shown, but when brackets 3 are supported directly upon the dash b, or other part of the vehicle to which brackets may be attached, lever 9 may be attached to the same part. Pins or stops 9ᵇ may be provided adjacent lever or handle 9 to retain the latter in set position with bolts 6 retracted from supports 4 when the latter are to be operated.

To protect the lower ends of supports 4 from injury, as by being kicked or knocked, I provide protectors 11, shown in the form of tubes having bases 12 alined with supports 4, which protectors 11 may be carried on any suitable part of the vehicle, such as upon the step or running board 13 (see Fig.
11). Protectors 11 may be of any suitable height, so that when the supports 4 are lowered they will enter or receive said protectors, since protectors 11 may enter the tubular supports 4.

The shield supporting brackets and guides may be rigidly supported, so that said guides retain a permanent position, as illustrated in Figs. 7, 8 and 9, but it may be desirable at times to tilt the shield from a vertical position. For this purpose I have shown the guides 3ᵇ as pivotally supported to swing as desired, to which end I have shown brackets 3 as made in two parts 3ᵈ, 3ᵉ, in Figs. 1 to 6, the part 3ᵈ being pivotally connected with the part 3ᵉ. The bracket parts 3ᵉ are shown provided with studs 3ᶠ receiving hubs or openings 3ᵍ of parts 3ᵈ whereby the parts 3ᵈ are swiveled. The parts 3ᵈ and 3ᵉ may be maintained in operative relation by means of springs 14 bearing against parts 3ᵈ and against screws 15 threaded in studs 3ᶠ, or the parts 3ᵈ and 3ᵉ may be held together by pressure of screw 15 as shown in Fig. 6. To retain the bracket parts 3ᵈ and the shield in set position I have shown locking means comprising one or more projections 16 on part 3ᵈ adapted to enter complemental concentrically disposed recesses 17 on part 3ᵉ, although the projections 16 may be on the parts 3ᵉ and the recesses 17 on the parts 3ᵈ. The bracket parts 3ᵈ are shown provided with working face 3ʰ to coact with the working face 3ⁱ of bracket part 3ᵉ to aid in maintaining the parts in relative positions. The arrangement is such that the bracket parts 3ᵈ may be rotated as desired to cause the supports 4 and the flexible shield 1 to incline more or less toward or from the driver, so that when the shield is raised as desired and tilted resistance of the wind against the shield may be reduced, and the shield may be brought closer to the driver. By having the supporting extensions 3ᵃ for the roller upon the swiveled bracket parts 3ᵈ the roller and the rolled part of shield 1 will maintain proper positions relatively to supports 4 in different tilted positions of the latter.

By means of my improvements the flexible shield may be raised and maintained at the desired height by sliding supports 4 through their guides, and when shield 1 is lowered the supports 4 and cross rod 4ᵃ will descend with the shield so that there need be no supporting parts of the flexible shield projecting upwardly above the same, and as the supports 4 may thus be maintained approximately along the sides of the vehicle they will not interfere with the occupants of the vehicle upon entering or leaving the same. Since the supports 4 and cross rod 4ᵃ are firmly united together, the wind pressure against the flexible shield will be uniformly distributed and the parts will maintain the desired positions. The shield is simple to operate, relatively cheap to manufacture, and efficient in use.

While I have illustrated and described a practical embodiment of my invention, it will be understood that the same is not limited to the details set forth, as the same may be varied, within the scope of the appended claims, without departing from the spirit of my invention.

Having now described my invention what I claim is:—

1. A wind shield comprising spaced longitudinally adjustable supports, guides free above and below for said supports, means for sustaining said supports in different positions of adjustment on opposite sides of said guides, a flexible shield, means for connecting one end of said flexible shield with one portion of said supports to be raised and lowered therewith, a roller connected with the other part of said flexible shield, and means to support said roller.

2. A wind shield comprising spaced supports rigidly connected by an interposed transverse member, spaced guides for guiding said supports for longitudinal adjustment, simultaneously operating devices to maintain said supports and member in different positions of adjustment and release said supports for adjustment, a flexible shield connected at one end with said member and movable therewith, and a roller between said supports to sustain the other end of said flexible shield.

3. A wind shield comprising spaced supports connected by a transverse member above their lower ends, spaced guides open above and below through which said supports have longitudinal adjustment, means to maintain said supports in different positions of longitudinal adjustment, a flexible shield connected at one end with said member and free and unobstructed thereabove, and a roller mounted below said member and connected with the lower part of said flexible shield, said roller being supported by the supports for said guides.

4. A wind shield comprising spaced parallel longitudinally adjustable supports connected together at their upper parts and free from each other therebelow, spaced brackets provided with guides open above and below to permit longitudinal sliding of said supports, locking devices for each support at equal heights on opposite sides of said guides, a flexible shield connected with the upper part of said supports, and free and unobstructed thereabove, a roller for supporting the lower part of said flexible shield, and means to support the roller.

5. A wind shield comprising a member bent in two places at a distance apart forming depending spaced longitudinally adjustable supports having an interposed transverse member adjacent their upper parts, spaced brackets provided with spaced guides open above and below for said supports, means on said brackets operating together for sustaining said supports in different positions of adjustment, a flexible shield connected with said member, and a roller connected with the lower part of said flexible shield and extending between said supports parallel with said member.

6. A wind shield comprising spaced longitudinally adjustable supports, a transverse member connecting said supports adjacent their upper parts only, brackets provided with guides for parts of said supports depending below said member, simultaneously operating means for sustaining said supports and member in different positions of adjustment, a flexible shield connected with said member, and a roller extending between said supports parallel to said member and connected with the lower part of said flexible shield.

7. A wind shield comprising spaced longitudinally adjustable supports connected together adjacent corresponding ends and free from each other therebelow, spaced brackets having means for guiding said supports, a flexible shield connected with said supports to be raised and lowered therewith, and a roller extending between said supports and connected with said flexible shield, said brackets being provided with stops and the supports having correspondingly spaced recesses receiving said stops for maintaining the supports equally in different positions of adjustment.

8. A wind shield comprising a flexible shield, a roller for the shield, means for adjustably locking the free portion of the shield in set position, means for locking the roller against rotation, and means for simultaneously releasing both of said locking means.

9. A wind shield comprising a flexible shield, adjustable supports for said shield, a roller for said shield, means for locking said supports in set position, means for locking said roller against rotation, and means to cause said locking means to operate coincidently to release the supports and the roller.

10. A wind shield comprising spaced longitudinally movable supports, means for guiding said supports, means for locking said supports in different positions of adjustment, a flexible shield connected with said supports, a roller connected with said shield, means for locking the roller against rotation, and means to cause said locking means to operate coincidently to release the supports and the roller.

11. A wind shield comprising spaced longitudinally movable supports, spaced brackets provided with means for guiding said supports, a flexible shield connected with said supports, a roller connected with said shield, means for sustaining said supports in different positions of adjustment, and means for locking said roller against rotation, said locking means being operatively connected with the means for sustaining the supports for releasing the roller upon the release of said supports.

12. A wind shield comprising spaced longitudinally movable supports, spaced brackets provided with means for guiding said supports, a flexible shield connected with said supports, a roller connected with said shield, means for sustaining said supports upon said brackets in different positions of adjustment, means for sustaining said roller upon said brackets, and means for locking said roller against rotation, said locking means being connected with the means that sustain the supports for coincidently releasing the roller and the supports.

13. A wind shield comprising longitudinally movable supports, brackets provided with means for guiding said supports, a flexible shield connected with said supports, a roller connected with said flexible shield, stops for sustaining said supports in different equal positions of longitudinal adjustment, a handle, and means connecting said handle with said stops for actuating them by one movement of the handle.

14. A wind shield comprising spaced longitudinally movable supports firmly connected at corresponding ends, spaced guides for guiding said supports, a flexible shield connected at one end with said supports, a roller connected with the opposite end of said flexible shield, means to support said roller, simultaneously operating devices for sustaining said supports in different positions of longitudinal adjustment and for releasing said supports, and means for retaining said devices released from said supports simultaneously.

15. A wind shield comprising longitudinally movable supports, brackets provided with means for guiding said supports, means to sustain said supports upon said brackets in different positions of adjustment, said brackets being provided with extensions, spaced from said guiding means, a roller mounted upon said extensions, and a flexible shield connected at one end with said roller and at its other end with said supports.

16. A wind shield comprising spaced longitudinally slidable supports, a flexible shield connected at one part with said supports, means to support the other part of said shield, guides free above and below, means for sustaining said supports upon said guides in positions of adjustment, and means to permit said supports and flexible shield to be inclined and retained in such position.

17. A wind shield comprising spaced adjustable supports rigidly connected at one part, a flexible shield attached at one part to the rigid connection between said supports and free and unobstructed thereabove, a roller to sustain the opposite part of said flexible shield, means to support said roller, means open above and below for guiding said supports and sustaining them in different positions of adjustment, said guiding means being pivotally supported to permit tilting of said supports and shield, and means for retaining the guiding means in set position.

18. A wind shield comprising spaced longitudinally adjustable supports, spaced brackets for said supports, a board interposed between and supporting said brackets in spaced relation, means to maintain said supports upon said brackets in different positions of adjustment, a flexible shield connected at one end with said supports, and a roller to sustain the opposite end of said shield, said brackets being pivotally supported to swing relatively to said board to permit tilting of said supports and shield, said roller being supported parallel to said board.

19. A wind shield comprising spaced longitudinally adjustable supports, spaced brackets provided with guides for said supports, means to maintain said supports spaced upon said brackets, a flexible shield connected at one end with said supports, a roller connected with the opposite part of said shield, said roller being carried by said brackets, said brackets being pivotally supported to permit tilting of said guides, supports and shield and simultaneously operating locking devices to sustain said supports upon said brackets.

20. A wind shield comprising spaced longitudinally movable supports connected together at one part, brackets provided with means for guiding and sustaining said supports, a board supporting and spacing said brackets apart, said board extending between said supports, means for pivotally supporting said brackets and retaining them in set positions, a flexible shield connected with said supports, and a roller interposed between said supports parallel to said board and connected with the lower part of said shield.

21. A wind shield comprising spaced supports connected together at their upper parts, and free from each other therebelow, spaced pivoted brackets having guides for said supports, said supports being slidable through and below said guides, means to sustain said supports in different positions of adjustment, a flexible shield connected with said supports, a roller connected with said shield and carried by said brackets above their pivots to move with the brackets, and means for retaining said brackets in different positions of adjustment.

22. A wind shield comprising spaced supports connected together at one part, brackets having guiding and sustaining means for said supports, said brackets comprising two parts pivotally connected together, one of said bracket parts having a projection and the other bracket part having complemental recesses to receive said projection, means for maintaining said projection in connection with either of said recesses, a flexible shield connected with said supports, and a roller connected with said flexible shield, portions of said supports being slidable below their guiding means and below the roller.

23. The combination of a board, guides attached thereto and spaced apart thereby, spaced longitudinally adjustable supports guided by said guides, means for sustaining said supports in different positions of adjustment with respect to said guides, a flexible shield connected at one end with said supports to be raised and lowered therewith, and a roller connected with the other end of said shield and carried by said board.

24. The combination of a board, spaced brackets attached thereto and having upwardly disposed guides, spaced longitudinally adjustable supports guided by said guides, means for sustaining said supports in different positions of adjustment with respect to said guides, a flexible shield connected at its upper end with said supports, and a roller connected with the lower end of the flexible shield, said roller being carried by said brackets.

25. In a wind shield the combination of a board, brackets attached thereto and spaced apart by said board, said brackets being provided with guides open at opposite ends, longitudinally movable supports slidable through said guides and connected rigidly together at their upper ends and free from each other therebelow, pins movable in directions across the planes of said supports, the latter having spaced recesses receiving said pins, a roller journaled adjacent said guides and extending between said supports, and a flexible shield connected at one end with said roller and at the other end with the upper ends of said supports.

26. In a wind shield the combination of a board, brackets attached thereto and spaced apart by said board, said brackets being provided with tubular guides open at opposite ends, longitudinally movable parallel supports slidable through said guides and provided with recesses, pins guided by said brackets and movable into said tubular guides to enter the recesses in said supports, means rigidly connecting the upper ends of said supports, a roller journaled adjacent said guides and extending between said supports, and a flexible shield connected with said roller and with the upper ends of said supports and free and unobstructed thereabove.

27. A wind shield comprising spaced parallel tubular longitudinally adjustable supports rigidly connected together by a transverse member at their upper ends and free from each other therebelow, said tubular supports being provided with equally and correspondingly spaced recesses, guides slidably receiving said supports, pins movable at an angle to the plane of the movement of said supports to enter the corresponding recesses therein, a roller extending between said supports parallel to said member, and a flexible shield connected with said roller and with said member.

28. A wind shield comprising spaced parallel tubular longitudinally adjustable supports rigidly connected together by a transverse member at their upper ends, said tubular supports being provided with equally and correspondingly spaced recesses, guides slidably receiving said supports, pins movable at an angle to the plane of the movement of said supports to enter the corresponding recesse therein, a roller extending between said supports parallel to said member, a flexible shield connected with said roller and with said member, and means for simultaneously operating said pins to simultaneously release said supports.

29. A wind shield comprising a flexible shield, adjustable supports for said flexible shield, a roller for said flexible shield, stops to retain said supports in different positoins of elevation, a lever operatively connected with one of said stops, and locking means for the roller actuated with said lever to retain and release the roller.

30. A wind shield comprising a flexible shield, adjustable supports for said flexible shield, a roller for said flexible shield, stops to retain said supports in different positions of elevation, a lever operatively connected with one of said stops, said roller having recesses, and a locking member operated by said lever to coact with said recesses to retain and release said roller.

31. A wind shield comprising a flexible shield, adjustable supports for said flexible shield, a roller for said flexible shield, stops to retain said supports in different positions of elevation, a movable member movably connected with one of said stops, and locking means for the roller having a member operatively connected with said movable member for retaining and releasing the roller.

32. A wind shield comprising a flexible shield, adjustable supports for said flexible shield, a roller for said flexible shield, stops to retain said supports in different positions of elevation, said roller being provided with recesses at one end, and a locking member connected with one of said stops and provided with means adjacent said recesses to coact therewith for retaining and releasing the roller.

Signed at New York city, in the county of New York, and State of New York, this 22nd day of December, A. D. 1910.

THEODORE F. BOURNE.

Witnesses:
RALPH H. RAPHAEL,
MARIE F. WAINRIGHT.